United States Patent [19]

Bunker et al.

[11] Patent Number: 4,839,339
[45] Date of Patent: Jun. 13, 1989

[54] SUPERCONDUCTOR PRECURSOR MIXTURES MADE BY PRECIPITATION METHOD

[75] Inventors: Bruce C. Bunker; Diana L. Lamppa; James A. Voigt, all of Albuquerque, N. Mex.

[73] Assignee: The United States of America as represented by the United States Department of Energy, Washington, D.C.

[21] Appl. No.: 160,443

[22] Filed: Feb. 25, 1988

[51] Int. Cl.$^4$ .................. C01F 17/00; C01G 3/02; C04B 35/50; H01L 39/12
[52] U.S. Cl. .................................. 505/1; 252/518; 252/521; 423/263; 423/593; 501/123; 501/152; 505/809; 505/810; 505/815
[58] Field of Search .............. 423/593, 263; 501/123, 501/152; 505/1, 809, 810, 815; 252/518, 521

[56] References Cited

U.S. PATENT DOCUMENTS

| | | | |
|---|---|---|---|
| 3,528,919 | 9/1970 | McNamara et al. | 423/593 |
| 3,699,044 | 10/1972 | Dosch et al. | 423/593 |
| 3,821,352 | 6/1974 | Gaudernack et al. | 423/21 |
| 4,339,424 | 7/1982 | Jacobson et al. | 423/593 |
| 4,376,709 | 3/1983 | Johnson et al. | 423/593 |
| 4,551,315 | 11/1985 | Marcantorio | 423/593 |
| 4,601,755 | 7/1986 | Melard et al. | 106/3 |
| 4,606,847 | 8/1986 | Woodhead | 252/363.5 |
| 4,627,966 | 12/1986 | Micheli | 423/263 |

OTHER PUBLICATIONS

"Preparation of High Tc-Y-Bn-Cu-O Superconductor using Colloidal Methods"-Fujiki et al.,-Jul.-1987, Japanese Jr. of Applied Physics, pp. 4159-4160.
"A Hydroxycarbonate Route to Superconductor Precursor Powders" Voigt et al., Dec. 1987, MRS Symposium Proceedings, vol. 99, pp. 635-638.
M. Cima & W. Rhine, "Powder Processing for Microstructural Control in Ceramic Superconductors", Ceramics Processing Research Laboratory, *Massachusetts Institute of Technology*, Report No. 82, pp. 1-15, Jun. 1987.
P. Gallagher, H. O'Bryan, S. Sunshine, & D. Murphy, "Oxygen Stoichiometry in Ba2YCu3Ox", *Material Research Bulletin*, No. 22, vol. 7, 955, Jul. 1987.
P. Courty & C. Marcilly, "A Scientific Approach to the Preparation of Bulk Mixed Oxide Catalysts", in G. Poncelet et al. (editors), *Preparation of Catalysts III*, Elsevier Science Publishers, Netherlands, pp. 485-519, 1983.
O. Abdel-Salam, "Activity Coefficients of Tetramethylammonium Carbonate, Bicarbonate and Hydroxide in Aqueous Medium", *Indian Journal of Chemistry*, vol. 21A, Aug. 1982, pp. 785-787.

*Primary Examiner*—Dennis Albrecht
*Assistant Examiner*—Ron Krasnow
*Attorney, Agent, or Firm*—Armand McMillan; James H. Chafin; Judson R. Hightower

[57] ABSTRACT

Method and apparatus for preparing highly pure homogeneous precursor powder mixtures for metal oxide superconductive ceramics. The mixes are prepared by instantaneous precipitation from stoichiometric solutions of metal salts such as nitrates at controlled pH's within the 9 to 12 range, by addition of solutions of non-complexing pyrolyzable cations, such as alkyammonium and carbonate ions.

2 Claims, 10 Drawing Sheets

SUPERCONDUCTOR PRECURSOR MIXTURES MADE BY PRECIPITATION METHOD

BACKGROUND OF THE INVENTION

1. Technical Field

The present invention is related generally to superconducting materials. More particularly, the present invention is related to new, high temperature superconducting ceramic compositions and a process for synthesizing the same.

2. State of the Art

Most ceramic materials in commercial applications are currently prepared by pressing together oxide powders and sintering or firing the pressed body into a strong, dense article. For such ceramic materials, the best mechanical properties such as tensile and compressive strength and fracture toughness are achieved if the final sintered body has a morphology consisting of fine oxide grains which are completely sintered together to form an object which has the minimum possible porosity (highest theoretical density). However, in most instances, the final grain size and degree of sintering in the ceramic are controlled by the properties of the powders used in the pressed body. The grain size of the ceramic is largely controlled by the size and degree of agglomeration of the starting powder particles. The larger the particle size, the larger are the grains in the final ceramic. In general, the pore size and degree of sintering are controlled by the particle size. Large powder particles are less active in sintering, producing more porous materials. The larger the porosity in the material, the poorer are the mechanical properties. Therefore, to form dense, fine-grained ceramics, it is desirable to start with fine particles in the powder. Control of particle shapes can also be important. Ideally, particles in the starting powder should be smaller than about 1 micron in size.

Many ceramic materials contain several different oxide constituents. For these materials, desired ceramic phases are produced by solid state reactions between constituent oxides during high temperature sintering. If the individual oxide particles are large, and if the solid state reactions are sluggish, it can be difficult to drive the desired reactions to completion, resulting in the production of ceramic materials which are compositionally inhomogeneous. Compositional inhomogenieties can produce unwanted phases and chemical gradients within the material which can degrade desired properties. Problems of inhomogenieties can best be solved by dispersing the individual components on as fine a scale as possible to minimize diffusion distances. If individual oxides are used, it is advantageous to use particles which are as fine as possible to promote reactions between oxides. However, greater homogenieties can be achieved if each powder particle contains a homogeneous mixture of the desired components before it is pressed into the pellet.

The new high critical temperature superconducting ceramics such as $YBa_2Cu_3O_{7-x}$(1,2,3) provide an example of how mixed-oxide processing can degrade ceramic microstructures and properties. Superconducting ceramics are conventionally prepared by the mixed-oxide route. For 1,2,3 a stoichiometric mixture of $Y_2O_3$, $BaCO_3$, and $CuO$ powders are ball-milled to break up powder agglomerates and to mix the individual components. The ball-milled powders typically contain particles and agglomerates of individual components which are tens of microns in diameter. To make the 1,2,3 material, the ball-milled powders are calcined to thermally decompose the $BaCO_3$ and to drive the solid state reactions between the individual oxides. Since the large grained powders are not particularly reactive, calcining temperatures of over 900° C. are required to make the 1,2,3 material. The high calcining temperature promotes further grain growth and partial sintering between particles. When the calcined powders are pressed into pellets and sintered, the resulting ceramics typically have low densities (<80% theoretical density), contain individual grains which can be larger than 50 microns in size, and can be so porous that visible light can pass through the entire sample. Because of their low densities, the ceramics have poor structural integrity and often crumble to the touch. Because of incomplete reactions during sintering, the pellets often contain extraneous phases, or have the desired phases with a range of oxygen stoichiometries. Therefore, the resulting material often has a low volume fraction of superconducting material. To prepare good superconductors, it is necessary to regrind the ceramic into a powder, resinter into ceramic parts, and recycle back and forth between regrinding and sintering until good properties are achieved. Clearly, the regrinding operation is highly undesirable, since it adds unnecessary processing steps and can lead to sample contamination. Heretofore, the only way to use mixedoxides to prepare dense superconducting material was to use hot isostatic or hot uniaxial pressing techniques in which high pressures are applied to the body at high temperatures to force sintering to occur. However, hot-pressing is limited in terms of sample size, sample geometry, and sintering atmosphere, making it of limited utility in the fabrication of useful superconducting parts.

Because of the problems inherent in processing mixed-oxides, alternate preparation methods have been studied, including rapid solidification (splat-cooling) from melts of superconducting phases, oxidation of metal alloys, chemical vapor deposition and molecular beam epitaxy techniques. An important subset of ceramic processing techniques are the so-called "chemprep" methods which involve dissolving the metals which comprise the oxide in either aqueous or organic solutions to promote mixing of the different elemental constituents. The metals can be removed from solution using a variety of methods, the simplest of which is evaporation (used in techniques such as spray drying or freeze drying). A related technique is the Pechini method, in which metals are dissolved with citric acid in ethylene glycol. The solution is thermally treated to form a gel which is then further heat treated to produce desired oxide phases.

However, a process which gives fine-grained, chemically homogeneous powders for producing superconductive ceramic materials has not heretofore been known or described.

SUMMARY OF THE INVENTION

It is, therefore, an object of the present invention to provide a chemical method for producing metal oxide powders, having desired properties for the manufacture of superconductive ceramics.

Other objects and advantages of the present invention will become apparent from the following detailed description of the invention.

BRIEF DESCRIPTION OF THE DRAWINGS

These and other objects, features and many of the attendant advantages of the invention will be better understood upon a reading of the following detailed description when considered in connection with the accompanying drawings wherein.

DETAILED DESCRIPTION OF THE INVENTION

Figure 1:
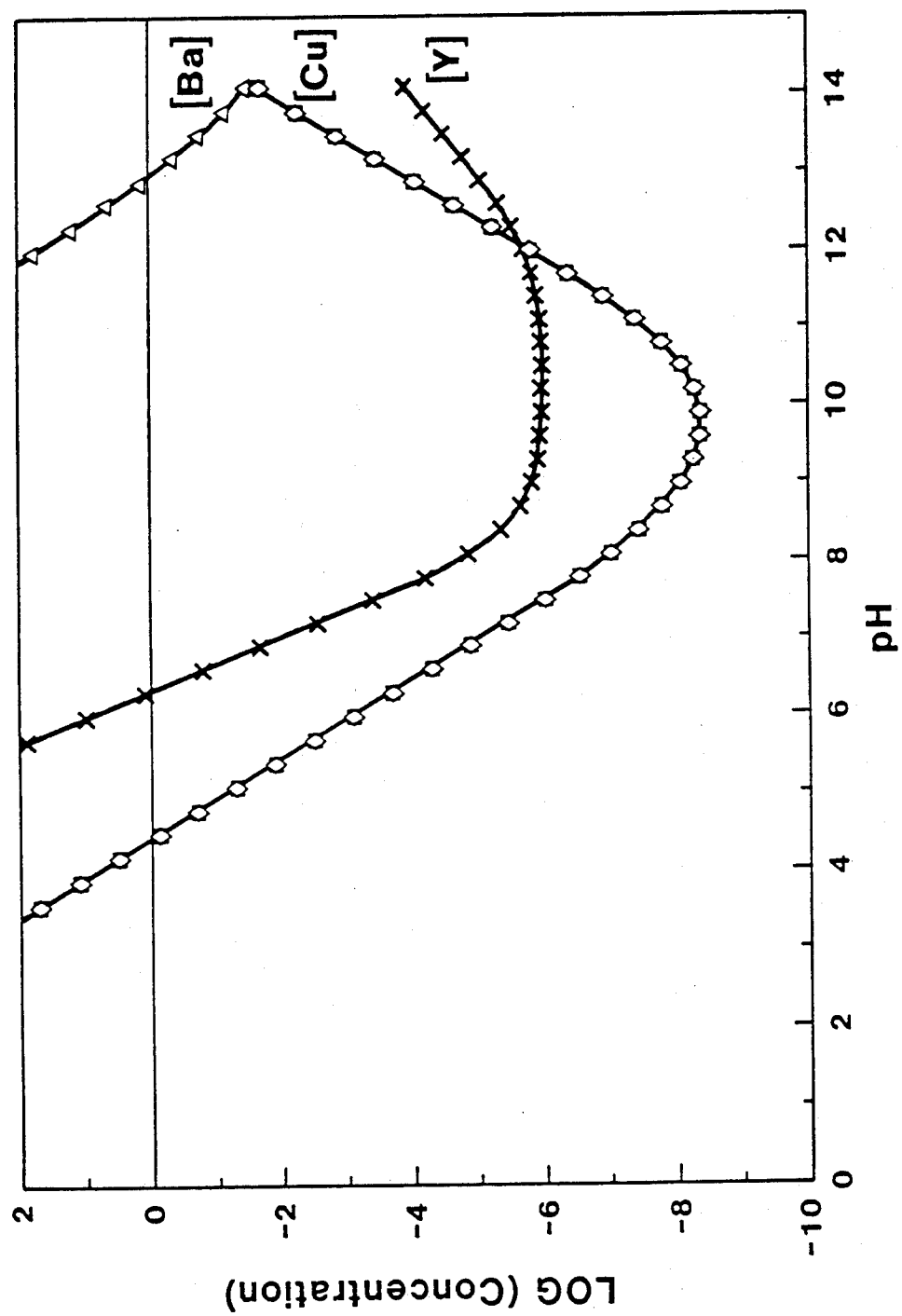
FIGS. 1 and 2 represent calculated solubility diagrams for the hydroxides and the hydroxycarbonates respectively showing the criticality of controlling solution chemistry.

The above and various other objects and advantages of the present invention are achieved by superconductor precursor powders and methods for synthesizing the same, superconductor ceramic materials then being obtainable from said precursor powders.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned hereunder are incorporated herein by reference.

The term "superconductor" as used herein means that the ceramic material produced in accordance with the present invention conducts electricity without any resistance below a certain critical temperature.

One of the initial steps in the preparation of the ceramic precursors in accordance with the present invention is the production of powders which are chemically homogeneous and fine-grained, eliminating many of the problems commonly associated with ball-milled mixed oxides. The process comprises controlled precipitation of insoluble salts by mixing two or more solutions, each of which contains highly soluble g components. For example, to prepare precursor powders for superconductors, solution A, which contains highly soluble metal salts such as yttrium, barium, and copper nitrates, is mixed with solution B, which contains highly soluble salts of the precipitating anions such as hydroxide, carbonate, and the like. If the precipitation process is properly carried out, each individual powder particle will contain a homogeneous mixture of all of the metal cations with the appropriate stoichiometry for making the desired ceramic. In addition, the powder particles will be at least as small as one micron, or have high surface areas, making the powders reactive for subsequent calcining and sintering steps. However, it should be pointed out that the use of chemical precipitation methods does not insure that the resulting powders will have the desired powder characteristics. The present invention has identified several key steps in the chemical precipitation which are necessary to preparing powders having desired properties:

First, careful control of pH is essential to insure simultaneous and complete precipitation of all reagents. Secondly, the solutions must be instantaneously and completely mixed. Special mixing cells are preferable for achieving proper mixing. Such mixing cells are illustrated herein as a part of a continuous solution processing system which enables the preparation of large quantities of precursor powders. As an additional critical step, the anions and cations which serve as counter ions in the original solutions, but which are not desired in the final product, must be pyrolyzable to minimize contamination of the final powder and must not interfere with the precipitation process.

As an example of the precipitation process, the preparation of insoluble hydroxide and carbonate precursors of the superconducting ceramic $YBa_2Cu_3O_{7-x}$ is now illustrated.

Figure 2:
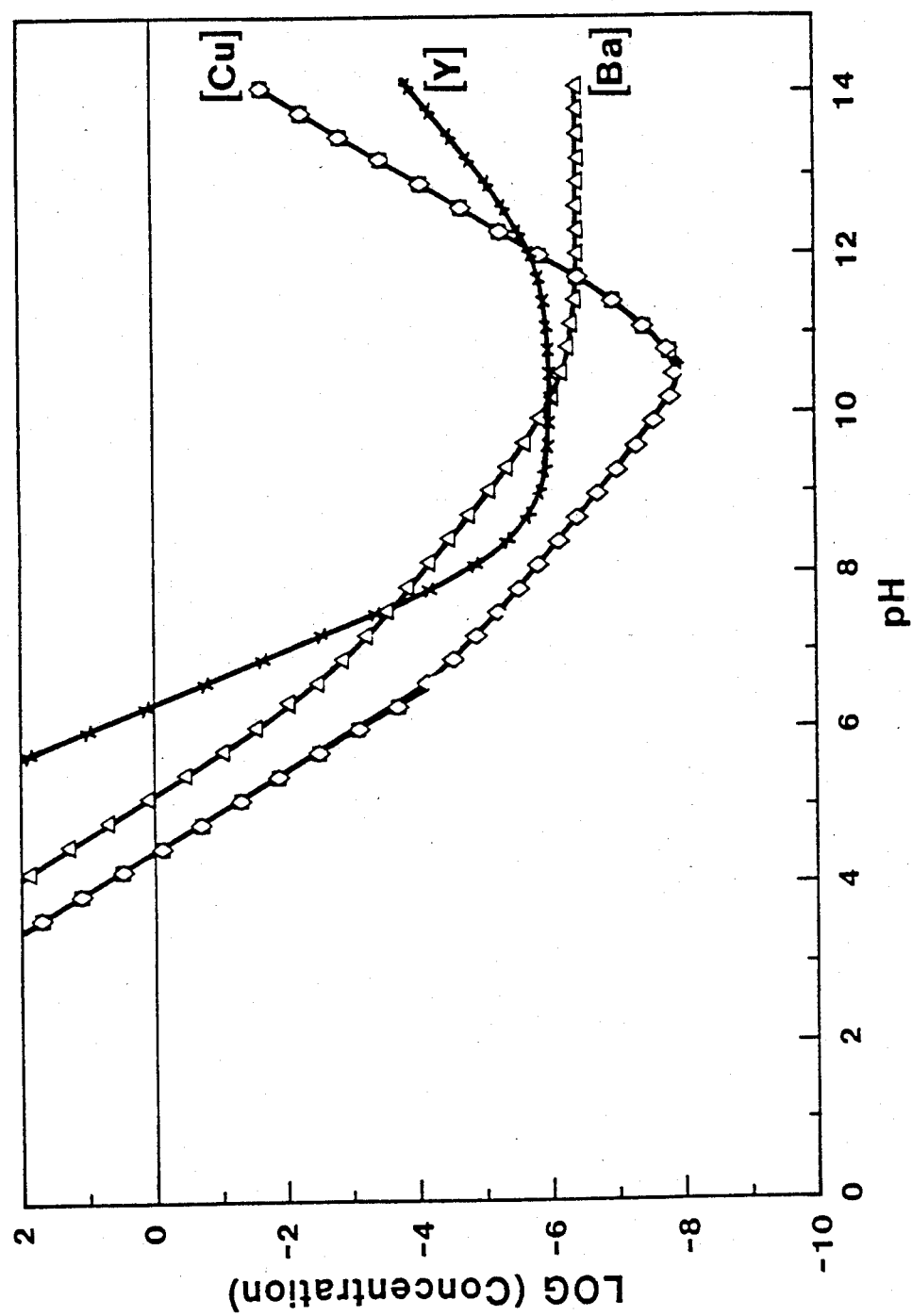

As mentioned earlier, an important aspect of the precipitation scheme of the present invention is the careful control of the pH of the mixture of solutions so that the desired pH is achieved instantaneously, and that the precipitant solution which is mixed with the metal salt solution contains the right mix of anions to achieve a high degree of supersaturation for all metals in the system. FIGS. 1 and 2, which represent calculated solubility diagrams for the hydroxides and carbonates, illustrate why the control of solution chemistry is critical.

Figure 3:
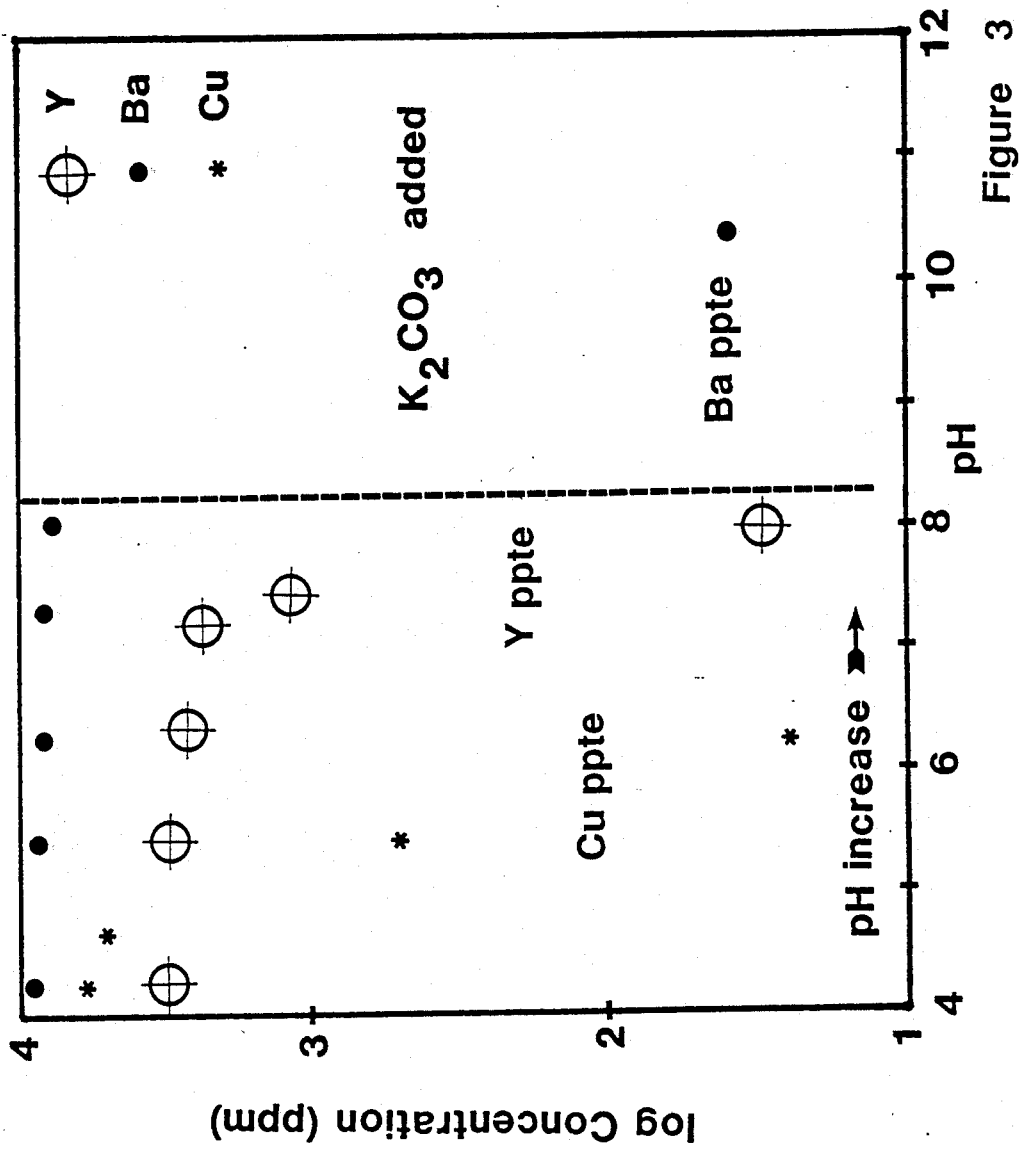
FIG. 3 shows the successive, rather than simultaneous precipitation of the components.

In order to produce a powder having a metal composition substantially the same as the composition of the starting cation solution, 99.9% of each of the dissolved metal concentrations remaining in the solution after the addition of precipitating anions must be three orders of magnitude lower than the starting metal concentrations. Typical pH and metal concentrations in a metal nitrate solution are pH 4 and 0.1 M. Metal hydroxides can be precipitated from these solutions by adding hydroxide ions to the solution and increasing the solution pH. However, the hydroxide solubility diagram shows that if the hydroxide solution is added gradually as in an acid-base titration, copper hydroxide is first (near pH 5), followed by Yttrium hydroxide near pH 7. The hydroxide diagram shows that barium hydroxide is soluble even in highly basic solutions and will not precipitate. The Argonne process for precipitation follows the simple titration route except that once the solution pH is titrated to pH 7–8, potassium carbonate is added to precipitate the barium. As shown in FIG. 2, $BaCO_3$ is predicted to be insoluble between pH 9 and pH 12, which encompasses the final pH of the Argonne mixture. Solution analyses obtained to duplicate the Argonne precipitation conditions (FIG. 3) show that as predicted, the process leads to the successive precipitation of copper hydroxide, yttrium hydroxide, and barium carbonate instead of simultaneous precipitation of all three components. In addition to inadequate mixing, the powders prepared by the Argonne process exhibit high levels of potassium contamination. Analyses show that the as-isolated powder contains over 13 wt % potassium. Careful washing can reduce the levels of contamination, but ven after 7 washes in DI water (the wash used in the Argonne process), the potassium contamination level is still almost 0.5 wt %. The potassium contaminants are not removed during either the calcining or sintering of the powders. During the course of developing the present invention, it was found that potassium contamination interferes with sintering, resulting in ceramic parts which fall apart when exposed to air, and that potassium also contaminates the superconducting phase, thereby degrading superconducting properties.

Figure 4:
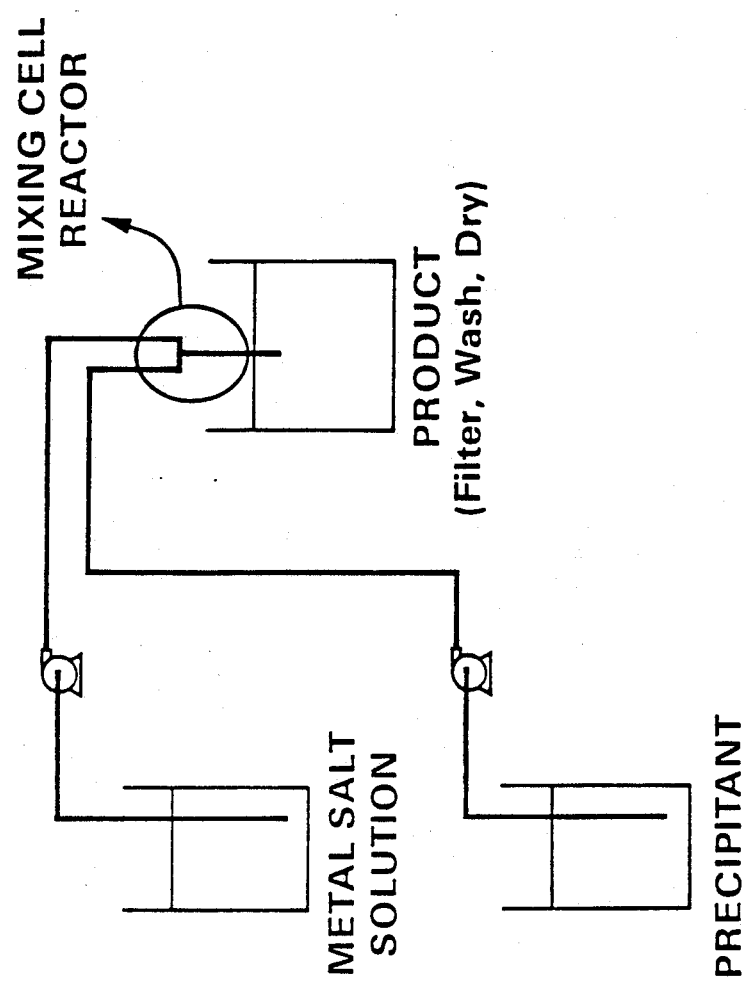
FIG. 4 schematically illustrates a device or assembly for instantaneous precipitation.

In contrast, the precipitation technique developed in accordance with the present invention eliminates the problems inherent in most precipitation processes involving aqueous solutions some of which have been mentioned above. As indicated by FIG. 2 if the precipitating anions are properly selected, there exists a range of pH values within which all metals can be precipitated simultaneously. For the superconductor example, all metals can be precipitated using a hydroxide-carbonate mixture if the pH is between pH 9 and 12. The key to proper precipitation is to identify the proper pH for complete precipitation and to achieve the proper pH instantaneously rather than gradually. Proper pH control can be achieved by instantaneous and complete mixing of the metal cation solution with the precipitating anion solution. In accordance with the present invention, there is developed a continuous processing system which achieves the desired level of mixing, producing amorphous powders which are an intimate mixture of all desired metal-hydroxycarbonate species. The system (FIG. 4) comprises two large reservoirs, one for the metal cation solution (which is acidic) and one for the precipitating anion solution (which is usually quite basic). Both solutions are delivered to a common mixing chamber with controlled flow rates using two peristaltic pumps and Tygon tubing. The mixing chamber can be of several designs, but generally consists of a small volume into which the rapidly flowing reactant solutions enter from opposing directions, producing turbulent mixing which homogenizes the reactant streams into a single product stream having the desired pH (intermediate between the pH's of the two parent reactant streams) in times as short as a millisecond. The product stream containing the precipitated powder is then collected in large containers. The resulting aqueous colloidal suspension is then filtered to remove most of the water. The filter cake can then either be washed with acetone or other suitable solvents to remove residual water and produce a fine, fluffy powder, or freeze-drying techniques can be utilized.

Figure 5:
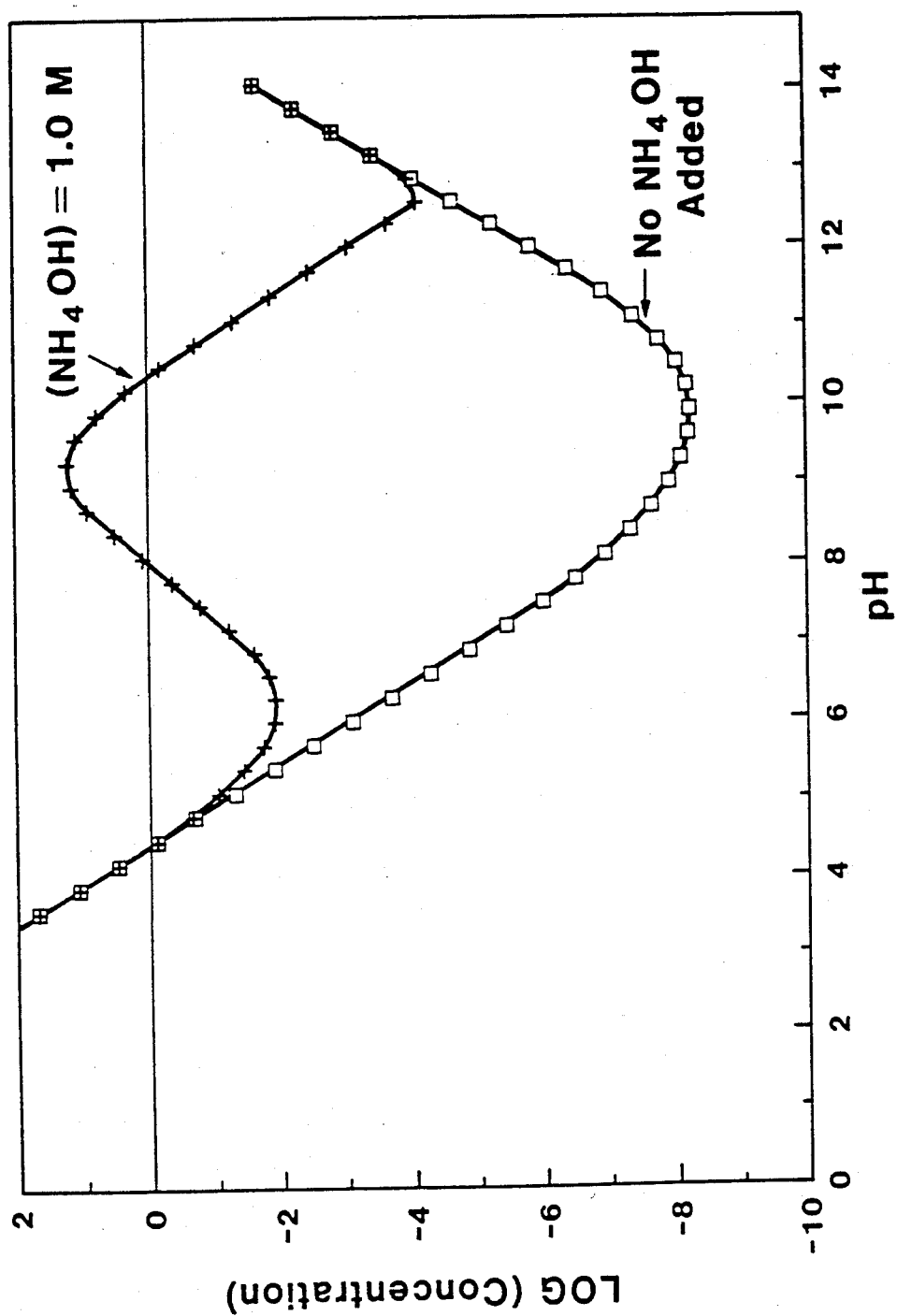
FIG. 5 shows that copper amine complexes are too soluble to promote copper precipitations.
Figure 6:
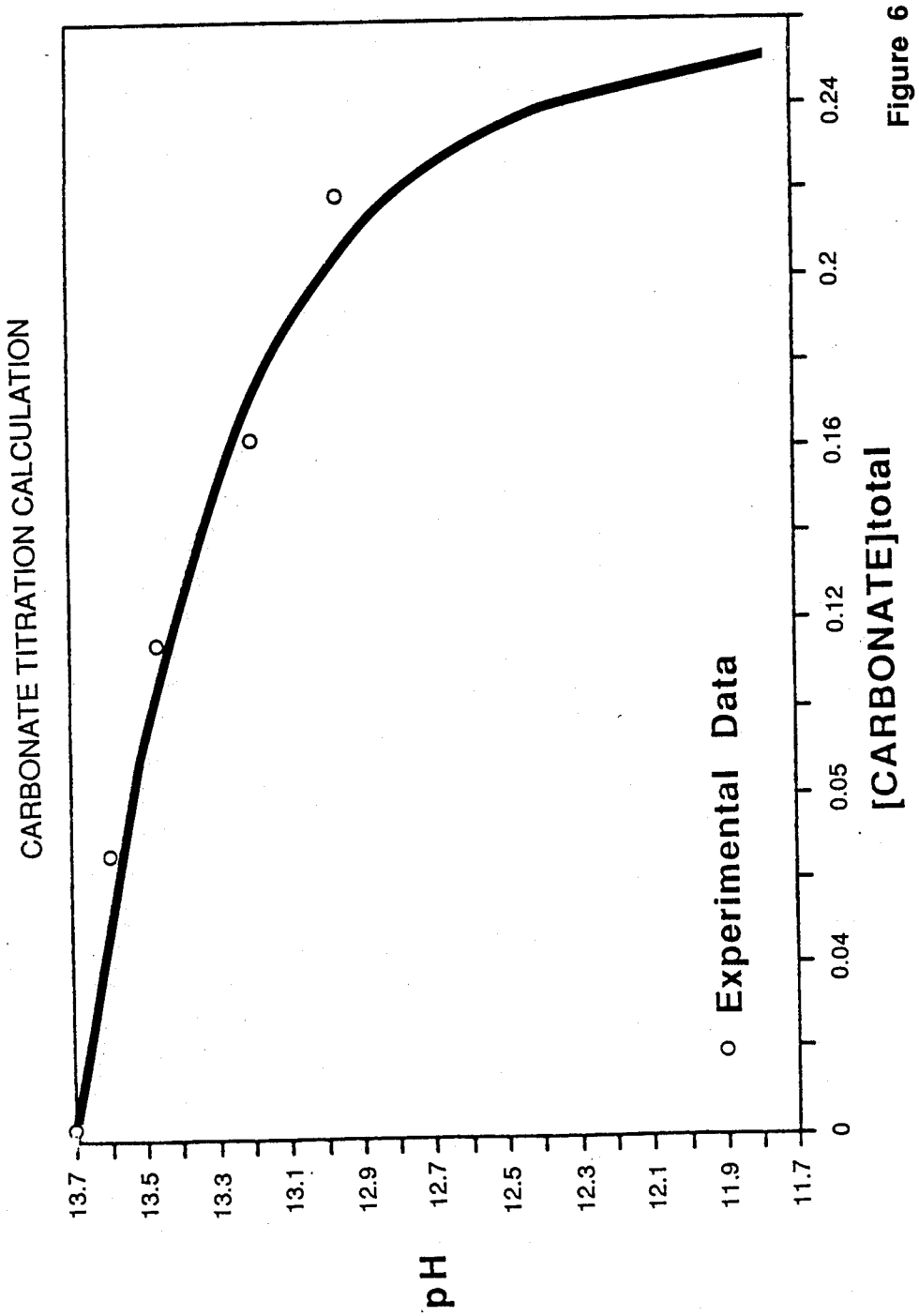
FIG. 6 shows how the solution pH of tetramethylammonium hydroxide solution varies as a function of dissolved $CO_2$ concentration.
Figure 7:
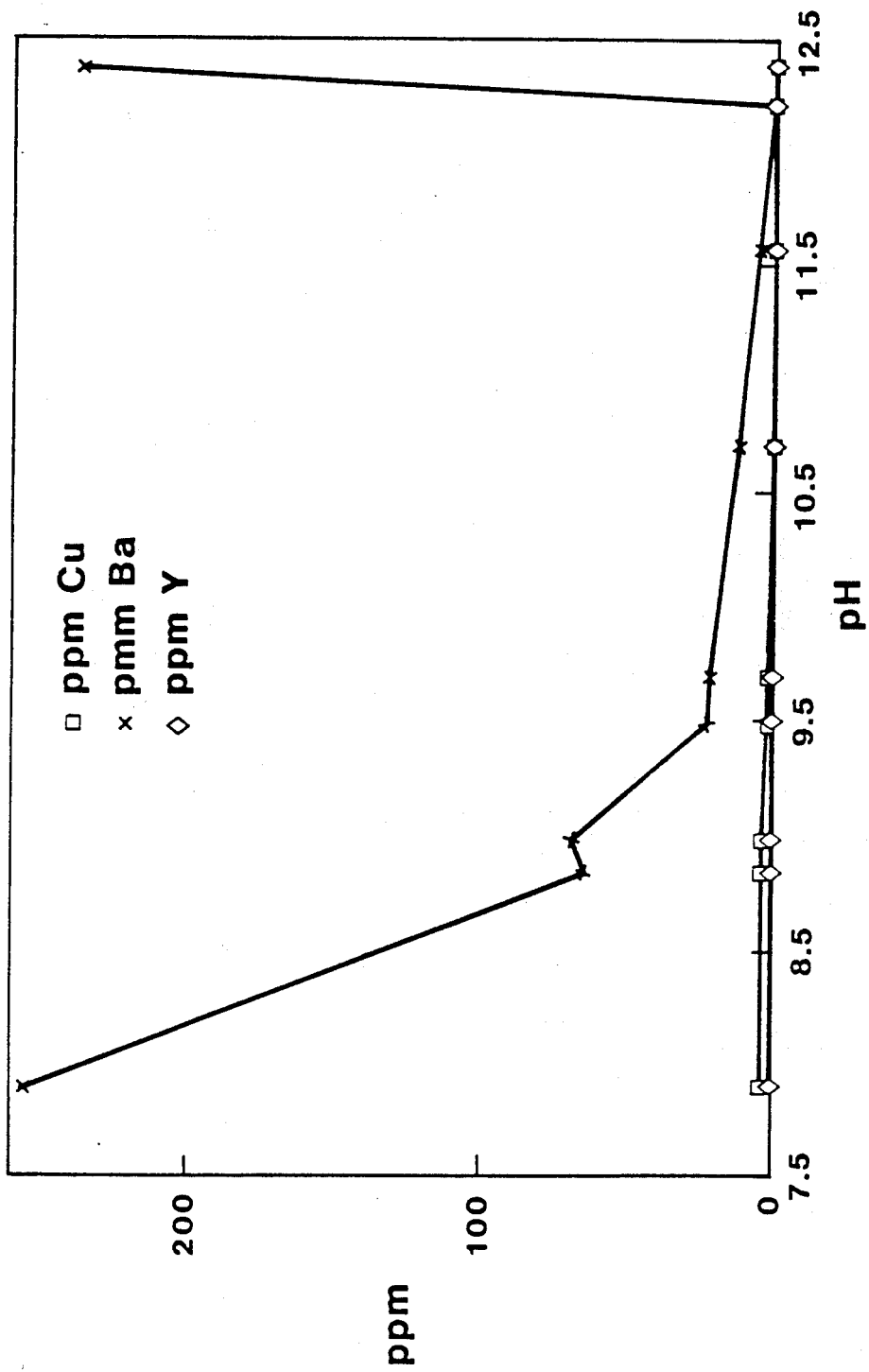
FIG. 7 shows filtrate analyses demonstrating that tetramethylammonium hydroxycarbonate solutions precipitate all desired cations in the pH range between 9 and 12.

While the continuous mixing system of the present invention solves the selective precipitation problems inherent in many precipitation processes, it does not solve the problems associated with contamination by unwanted cations and anions which are present as counter ions in the initial reactant solutions. For example, if metal chlorides are used in the cation solution and a mixture of potassium hydroxide and potassium carbonate in the precipitating anion solution, it is found that the resulting powders can be contaminated with as much as 1 wt % chloride ion and 1 wt % potassium. Neither of these impurities are eliminated by subsequent calcining and sintering at high temperatures and are retained in the final ceramic. To eliminate such contamination problem, the present invention employs counter ions which can be thermally decomposed during high temperature processing. For the metal cation solution, use of metal nitrate solutions is a standard remedy for the anion contamination problem because nitrates can be thermally decomposed at relatively low temperatures. For many ceramic systems, the cation of choice for the precipitating anion solution is the ammonium ion, since this cation can also be decomposed during calcining. However, for superconducting ceramics containing copper, the ammonium ion cannot be used. Copper ammine complexes are highly stable and are also very soluble (FIG. 5). The ammonium ion prevents copper from precipitating. In addition, ammonium hydroxide solutions are much less basic than metal hydroxide solutions of a similar concentration due to acid-base equilibrium between the ammonium cation and ammonia which buffers the solution pH to around pH 10. Therefore, for many metals, the pH required for complete precipitation, which is intermediate between the pH values of the cation and anion streams, cannot be reached. To allow for more flexible pH control and to eliminate the formation of undesired complexes, the present invention employs tetraalkylammonium ions such as the tetramethylammonium cation as the counter ion of choice in the precipitating anion solution. With this counter ion, no copper complexes are formed, and anion solutions are produced which are as basic as pH 14. For preparing superconductor precursors, the anion solution must contain both hydroxides and carbonates. Although tetramethylammonium hydroxide is commercially available, a commercial source for tetramethylammonium carbonate was not readily identified. Therefore, mixed hydroxide-carbonate solutions are prepared by bubbling carbon dioxide gas through a solution containing tetramethylammonium hydroxide. The carbon dioxide dissolves in water to form carbonic acid, which neutralizes some of the hydroxide ions to form carbonate ions. As more $CO_2$ is added, the carbonate concentration in solution increases, and the solution pH decreases. At low pH, carbonate ions become protonated and form bicarbonate ions. By varying the initial concentration of ammonium hydroxide and the amount of $CO_2$ bubbled through the solution, both the pH and carbonate concentrations are controlled in the precipitating anion solution, which consists of a mixture of tetramethylammonium hydroxide and carbonate (FIG. 6). Solution analyses of filtrates taken from precipitate synthesis as a function of the pH of the precipitating anion solution show (FIG. 7) that complete precipitation is achieved in the pH range from approximately pH 9 to pH 12. Use of this anion solution produces powders which are contaminated with the tetramethylammonium cation, but the ontaminant can be removed by heating the powders to temperatures as low as 400° C.

Illustrated hereunder are the conditions employed for preparing a batch of powder used as precursor to $YBa_2Cu_3O_{7-x}$, the powder characteristics, and the preparation of superconducting ceramics therefrom.

EXAMPLE 1

I. Powder Preparation

One liter of the cation solution was prepared by dissolving 12.6 gm of $Y(NO_3)_3.6H_2O$, 18.3 gm of $Ba(NO_3)_2$, and 22.5 gm of $Cu(NO_3)_2.2H_2O$ in deionized water to make a solution of nominal salt concentrations of 0.033 M (2934 ppm) in Y, 0.067 M (9199 ppm) in Ba, and 0.1 M (6350 ppm) in Cu. An inductively coupled plasma emission spectrometer was used to check solution concentrations (2940 ppm Y, 8800 ppm Ba, and 6200 ppm Cu), which agreed with the calculated values within the measurement error of 10%. (Solution concentrations can be adjusted to desired values at this point.) For the anion solution, 1000 ml of a 0.5 M solution of tetramethylammonium hydroxide (93.4 gm of Aldrich 97% $(CH_3)_4NOH.5H_2O$ powder in deionized water) having an initial pH of 13.2 (as measured with a combination pH electrode) was used. Carbon dioxide was bubbled through the anion solution until the solution pH dropped to a value of 12.8, corresponding to a carbonate concentration of 0.4 M. (Carbonate concentrations were determined from calibration curves based both on calculations of carbonate concentration vs. solution pH from acid-base equilibria, and from standard carbonate assays of the solutions.) Solutions were stored in polyethylene carboys prior to use.

For the precipitation process, a section of R3603 Tygon tubing (1.6 mm ID) was immersed into each of the reactant solutions. Each of the tubes were run from its g respective feed solution through a Cole-Palmer Model 7014 pump head. The pump heads were connected to a single peristaltic pump (Cole-Palmer Model 7520-25 Masterflex Pump). The remaining ends of the two feed tubes were connected to the inlet ports of a flow-through titanium ultrasonic horn (Sonics and Materials, Inc.). The flowthrough horn served as a "T-mixing" reactor. In addition to the improved mixing of the mixing cell reactor, ultrasonic agitation was provided by connecting the horn to a 500 watt ultrasonic power supply operating at 20 kHz (Model VC500 variable power ultrasonic processor, Sonics and Materials, Inc.). The ultrasonic processing unit was operated at maximum power (at a power level setting of 10). The output of the mixing T reactor flowed into a 500 ml pyrex reaction kettle_bottom (Fisher Scientific) and was stirred via a magnetic stir bar/stirrer. The reaction kettle was fitted with a product removal tube which was connected to R3603 Tygon tubing (3.1 mm ID). The product removal tubing was run through a Model 7016 pump head which was connected to a Model 7520-25 Masterflex pump and into a product holding tank. The pumping speed for the inlet pump was set to deliver each feed at a volumetric flow rate of about 50 ml/min. To maintain a constant volume of 500 ml in the reaction kettle, the product removal pump was set to remove the product at a rate of 100 ml/min. To initiate the precipitation reaction, the feed pump was turned on, sending both the metal cation and precipitating anion solutions into opposite arms of the T-mixer. When the product reached a volume of 500 ml in the reaction kettle, the product removal pump was turned on and the product solution containing colloidal particles of the hydroxy-carbonate precipitate was collected in the holding tank. The pH of the product stream, measured several milliseconds after mixing, was 9.5 and was stable as a function of time. The product was filtered under vacuum on a medium glass frit. The filtrate was analyzed for Y, Ba, and Cu using an inductively coupled plasma emission spectrometer to check for complete precipitation. The concentrations measured in the filtrate were <0.1 ppm Y, 53 ppm Ba, and <0.1 ppm Cu, indicating that over 99.4% of each dissolved metal was precipitated. The precipitate was washed several times with acetone, and dried in a vacuum oven to produce a fine, blue, fluffy powder.

II. Powder Characterization

The chemical composition of the powder was determined by dissolving 0.011 gm of the powder in 100 ml of nitric acid and analyzing for metal content using inductively coupled plasma emission spectroscopy. The solution analysis (9.4 ppm Y, 29.7 ppm Ba, 19.2 ppm Cu) showed that the ratio of cations in the final product is 1.1 Y:2.1 Ba:3 Cu, which is similar to the desired ratio of 1 Y:2 Ba:3 Cu within the experimental error of the solution analysis. X-ray analysis of the powder showed that it is amorphous. Scanning electron microscope (SEM) images of the powder showed that it consists of 1 to 3 micron agglomerates of extremely small (<0.05 micron) particles. The powder has a measured B.E.T. surface area of approximately 80 $m^2$/gm. The high surface of the powder makes it more active for sintering than fully dense one micron sized particles, which have a surface area of closer to 1 $m^2$/gm.

III. Use of Precipitate Precursors to Prepare Superconducting Oxides

Figure 8:
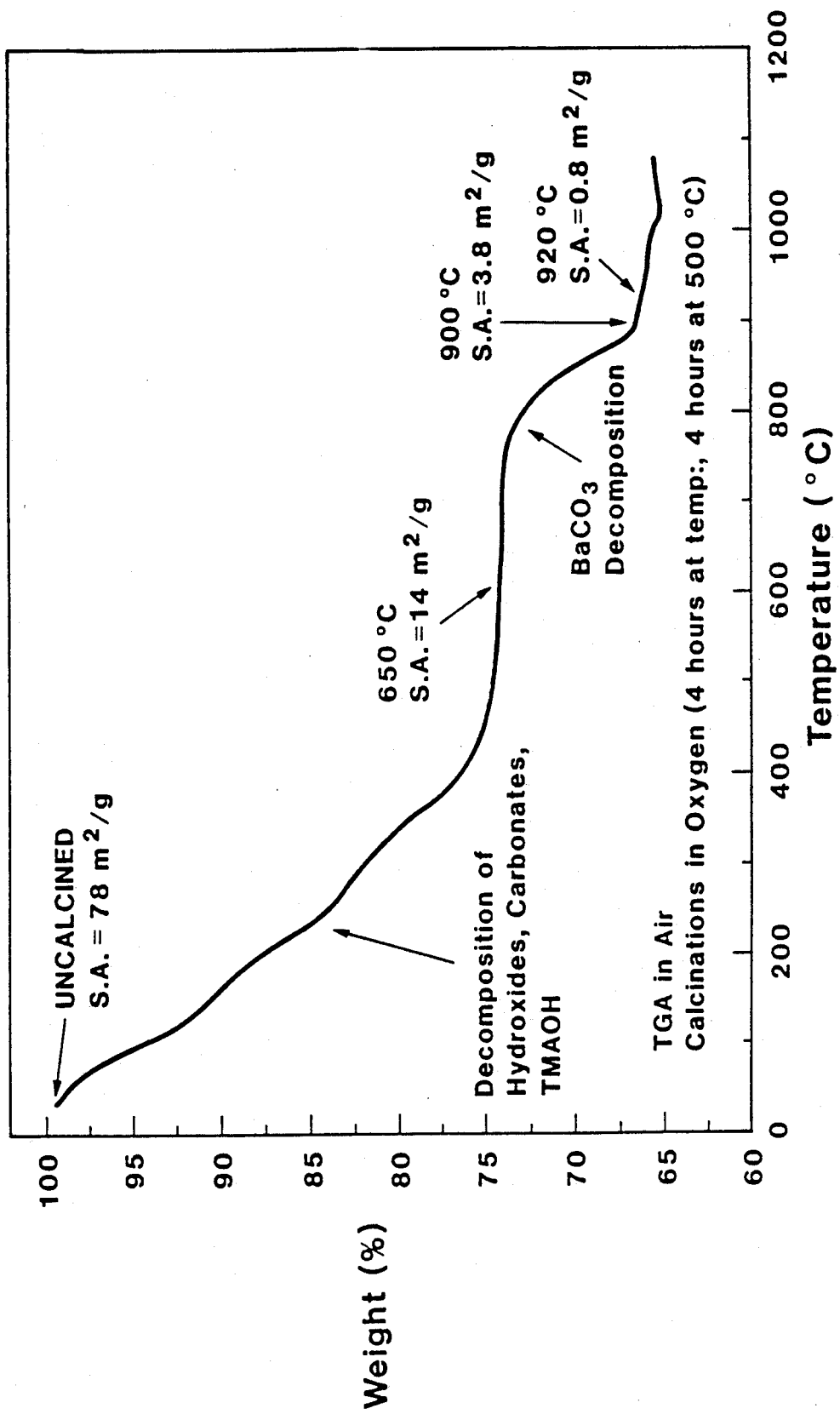
FIG. 8 and FIG. 9 show that heating the precipitates of the present invention to above 400° C. thermally decomposes all impurities except barium carbonate, which decomposes at 880° C.
Figure 9:
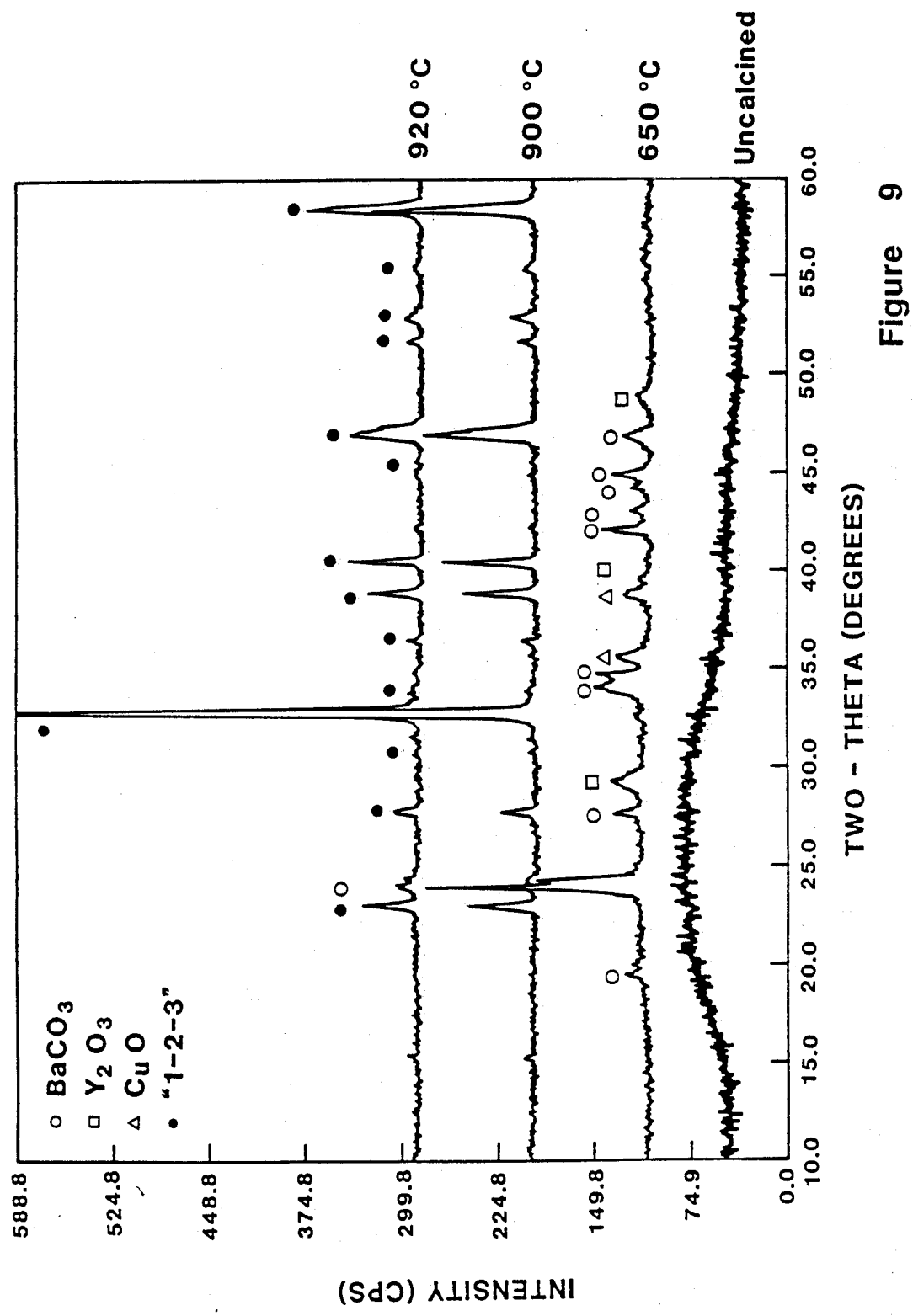

The powders prepared by the precipitation process of the present invention comprises an intimate mixture of metal hydroxides and carbonates. The powders are required to be calcined and/or sintered at high temperatures to convert them into the desired oxide phases. Thermogravimetric analyses (FIG. 8) coupled with differential thermal analyses and X-ray results (FIG. 9) show that the amorphous precipitate decomposes in two stages. Below 400° C., thermal decomposition is seen of tetramethylammonium hydroxide, the metal hydroxides, and any Yttrium or copper carbonates which are present to form an intimate mixture of $BaCO_3$, CuO, and $Y_2O_3$. The $BaCO_3$ decomposes as low as 800° C., accompanied by the formation of the desired $YBa_2Cu_3O_{7-x}$ phase. As shown, total calcination lowers the effective surface area of the powders from about 80 to about 1 $m^2$/gm, corresponding to the formation of dense oxide particles which are about 1 micron in diameter. Powders with particles as small as 0.1 micron in diameter have been prepared.

Partially or totally calcined precipitates are used in sintering studies to examine the range of ceramic microstructures which can be prepared using chem-prep powders. It was found that uncalcined powders can be sintered to make superconducting ceramics. However, these ceramics tend to be porous (80% theoretical densities) due to the loss of outgassed material (35 wt %, see FIG. 8) during sintering. Totally calcined materials exhibit less sintering because of their lower surface areas and because they contain fewer reactive sites such as hydroxyl groups. The decreased powder activity results in the formation of sintered ceramics having similar porosities to those obtained using uncalcined powders. However, by sintering together powders which have been partially calcined at 650° C., it was found that superconducting ceramics can be obtained which have greater than 95% theoretical densities. With partial calcining, most of the impurities in the powders are decomposed without totally deactivating the powders toward sintering. Such high densities cannot be achieved using mixed-oxides without the application of pressure during sintering. Other parameters which are important for sintering of the powders are the sintering temperature (more sintering occurs at 990° C. than at 950° C.), sintering atmosphere (air promotes sintering better than oxygen gas), and the nature of anions present as contaminants in the powder prior to calcining. It was found that when the starting metal salt solution is metal chloride, rather than metal nitrate, trace amount of an oxychloride phase is produced which is liquid at the sintering temperature and promotes grain growth and densification. By varying processing conditions, a wide range of microstructures can be produced, thus having much more microstructural control than can be achieved using the mixed-oxides. By simple sintering, one can generate structures which are between 80% to 100% dense, which have grains ranging from equiaxed 1 micron diameter grains to $5 \times 100$ micron plates of the superconducting phase. One can also generate samples having different superconducting properties (see magnetic flux exclusion and expulsion measurements in Table I) by varying either powder processing or calcining and sintering conditions. In contrast to mixed-oxide routes, the present invention allows the production of good superconductors without having to resort to tedious regrinding and resintering steps.

hydrolyze in the presence of water, it could be forced out of solution by using tetramethylhydroxide (TMAOH). The hydroxyl source provided by TMAOH would precipitate the copper as a hydroxide.

Having thus carried out the precipitation, it is desirable to carefully wash the coprecipitate to remove as much of the residual carbon containing reaction by-products as possible. This helps minimize the formation of barium carbonate during the calcination operation employed to convert the precipitate to the superconducting 1,2,3 phase. Calcination conditions and subsequent powder processing operations are similar to those described in Example 1.

It may be noted that various precipitating anion systems can, of course, be similarly employed including oxalates, acetates, citrates, lactates, and the like. For illustrate purposes, the oxalate system is now described.

EXAMPLE 3

Oxalate System

Example 2 describes a precipitation system in which

TABLE I

Relationship of Magnetic Properties of Superconductors Prepared From Precipitates of the Present Invention and Processing Conditions

|  | Salt | pH | Calcine Temp. (°C.) | Sinter Temp (°C.) | Atm. | Exclusion [(emu/g) at 5°K. & 95 Oe] | Expulsion |
|---|---|---|---|---|---|---|---|
| Increasing Density ↑ | Chloride | 10.5 | 650 | 950 | Air | −1.100 | −0.097 |
|  | Nitrate | 10.5 | 650 | 950 | Air | −0.995 | −0.133 |
|  | Nitrate | 10.5 | 650 | 950 | Oxy | −0.356 | −0.117 |
|  | Nitrate | 10.5 | Uncal. | 950 | Oxy | −0.281 | −0.102 |
|  | Nitrate | 10.5 | 920 | 950 | Air | −0.424 | −0.163 |
|  | Nitrate | 9.5 | 920 | 950 | Air | −0.404 | −0.152 |

EXAMPLE 2

Alkoxide System

The reactor system described herein can also be used to prepare the 1,2,3 material from other metal precursor compounds. An example is the use of alkoxides of yttrium, copper, and/or barium as the metal sources. These compounds are dissolved stoichiometrically in suitable non-aqueous solvent systems such as alcohols to form the metal feed solution for use in the precipitation system. The precipitant system replacing the "precipitating anion" solution of Example 1 is a pH-adjusted solution of water dissolved in the same alcohol. Water is the precipitating agent for this system since it reacts with different alkoxides to form insoluble hydrous oxide precipitates. Since the various metal alkoxides have different rates of hydrolysis, it is important that very high supersaturation levels are maintained during the mixing of the two solutions, otherwise a compositionally inhomogeneous product will be obtained. The supersaturation level is controlled using the reactor system of the present invention through the use of a reactor of the "T" geometry in conjunction with careful pH control which regulates the hydrolysis kinetics. If basic pH conditions are required, tetramethylammonium hydroxide can be added to the precipitant mixture since it is mutually soluble in water and alcohol. For more acidic conditions, a mutually soluble organic acid such as citric or lactic acid and the like can be used.

It should be noted that it is not necessary to use a total metal alkoxide system as the source of the yttrium, barium or copper. For example, the alkoxides of copper are only sparingly soluble in their parent alcohol. Therefore, another source of copper could be used such as copper acetylacetonate. Since copper would not the source of the constituent metals were alkoxides instead of nitrates as given in Example 1. In Example 3, nitrates are used as the metal source, but oxalate anion is used as the precipitant in place of the tetramethylammonium hydroxide/tetramethylammonium carbonate used in Example 1. Therefore, metal containing feed solution is obtained at the same concentrations as in Example I for preparing the 1, 2,3, precursor (i.e., 0.033 M Yttrium nitrate, 0.066 M barium nitrate, and 0.100 M copper nitrate). The oxalate source for the precipitant feed stream is oxalic acid dissolved in water at a concent.ration of 0.216 M (at stoichiometric incorporation). To insure complete precipitation of all three metal constituents, it is necessary to adjust the pH of the precipitant feed stream so that the final pH after mixing of the two streams is about 11. This pH adjustment is accomplished by using TMAOH. (If more than a two-fold excess of oxalate is used, soluble copper oxalate species form which inhibit total precipitation of the copper, even if there is careful control of pH.) Again, TMAOH is the base of choice because of its noncomplexing character and pyrolyzability. The continuous precipitation "T" mixing reactor system is preferable as explained herein, supra (i.e., for complete and rapid mixing of solutions and obtaining the desired pH instantaneously).

The oxalate coprecipitate decomposes during calcination in a fashion similar to that of the hydroxycarbonate coprecipitate. The majority of volatiles and oxalate species are removed at about 300° C. If the calcination is carried out in air, barium oxalate decomposes to form barium carbonate, which does not decompose until about 920° C. After the barium carbonate is decomposed, the 1,2,3 oxide phase is obtained. The 1,2,3 powder is processed into the superconducting ceramic by the same method as given in Example 1.

Figure 10:
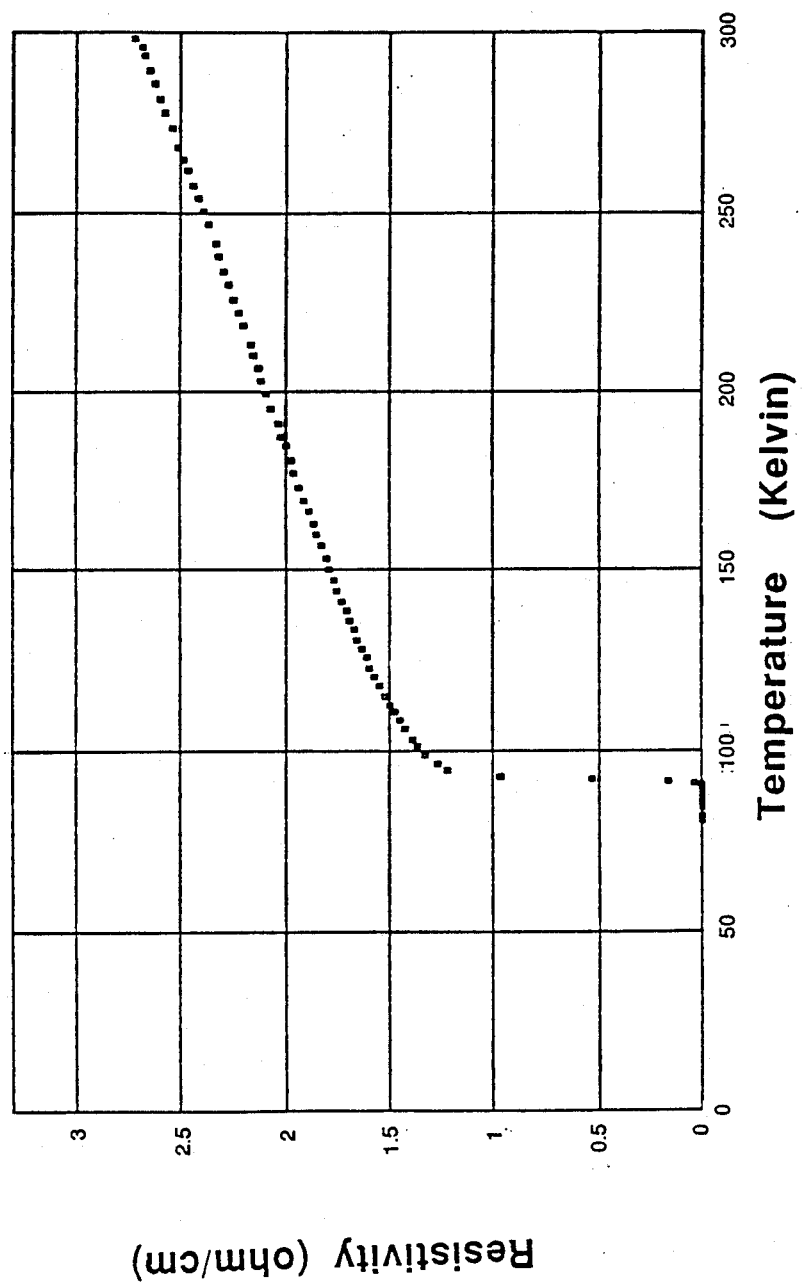
FIG. 10 shows that ceramic pellets made from the precipitates of the present invention become superconducting at 92° K.

When tested by standard procedures, the ceramics produced by the method of the present invention, are found to be superconductors (conducting electrical ourrent substantially without resistance) at about 92° K. (FIG. 10).

It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for preparing a precursor powder which can be calcined to form a superconducting ceramic, said method comprising:
   (a) forming an aqueous solution of metal salts composed of the metals that will constitute part of the ceramic and of pyrolyzable counter anions, said metal salts being present in the stoichiometric proportions necessary to form said ceramic;
   (b) forming an aqueous solution comprising a lower alkylammonium hydroxide and carbonate anions;
   (c) instantaneously and completely mixing said solutions together at pH's within the range of 9 to 12 under controlled pH conditions and in quantities that will yield the precursor powder with the exact cation ratios required for the final superconducting ceramic; and
   (d) collecting the resulting precipitated precursor powder which consists of the desired superconductor cations, hydroxide and carbonate anions, and minor quantities of pyrolyzable counter ions.

2. A method for preparing a precursor powder which can be calcined to form a superconductor ceramic, said method comprising:
   (a) forming an aqueous solution of salts bf yttrium, barium, and copper in molar proportions substantially equal to 1:2:3 with a pyrolyzable counter anion;
   (b) forming a precipitating anion solution consisting of a stoichiometric quantity of an about 0.5 aqueous tetramethylammonium hydroxide containing about 0.14 M carbonate ions and 0.2 molar aqueous oxalic acid;
   (c) instantaneously and completely mixing said solutions together at a pH within the range of 9 to 12 under controlled pH conditions; and
   (d) collecting the resulting precipitated precursor powder, which consists of the desired superconductor cations, the pyrolyzable precipitating anions, and minor quantities of pyrolyzable counter ions.

* * * * *